Nov. 15, 1927.
W. A. C. SCHLUETER
1,649,746
GRAVITY BALANCE
Filed Oct. 20, 1926
3 Sheets-Sheet 2
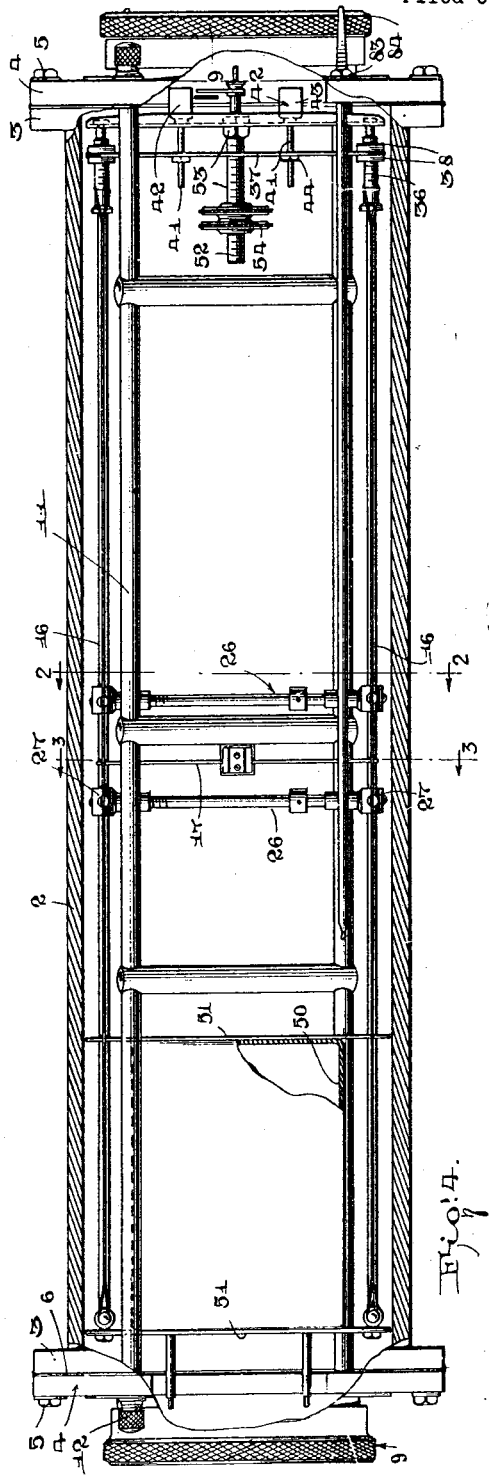
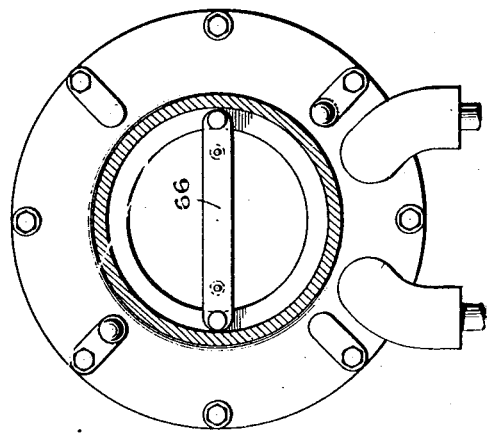
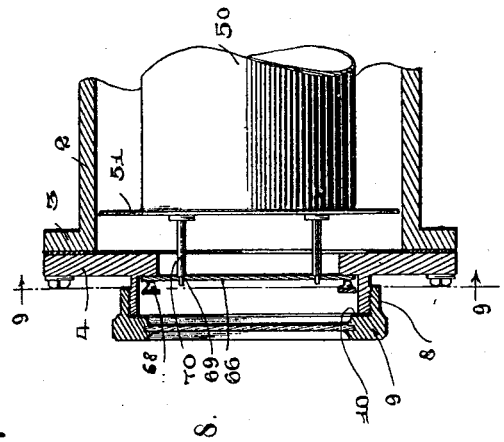
INVENTOR
Wm. A.C. Schlueter
BY
ATTORNEY Nov. 15, 1927.
W. A. C. SCHLUETER
GRAVITY BALANCE
Filed Oct. 20, 1926      3 Sheets-Sheet 3
1,649,746
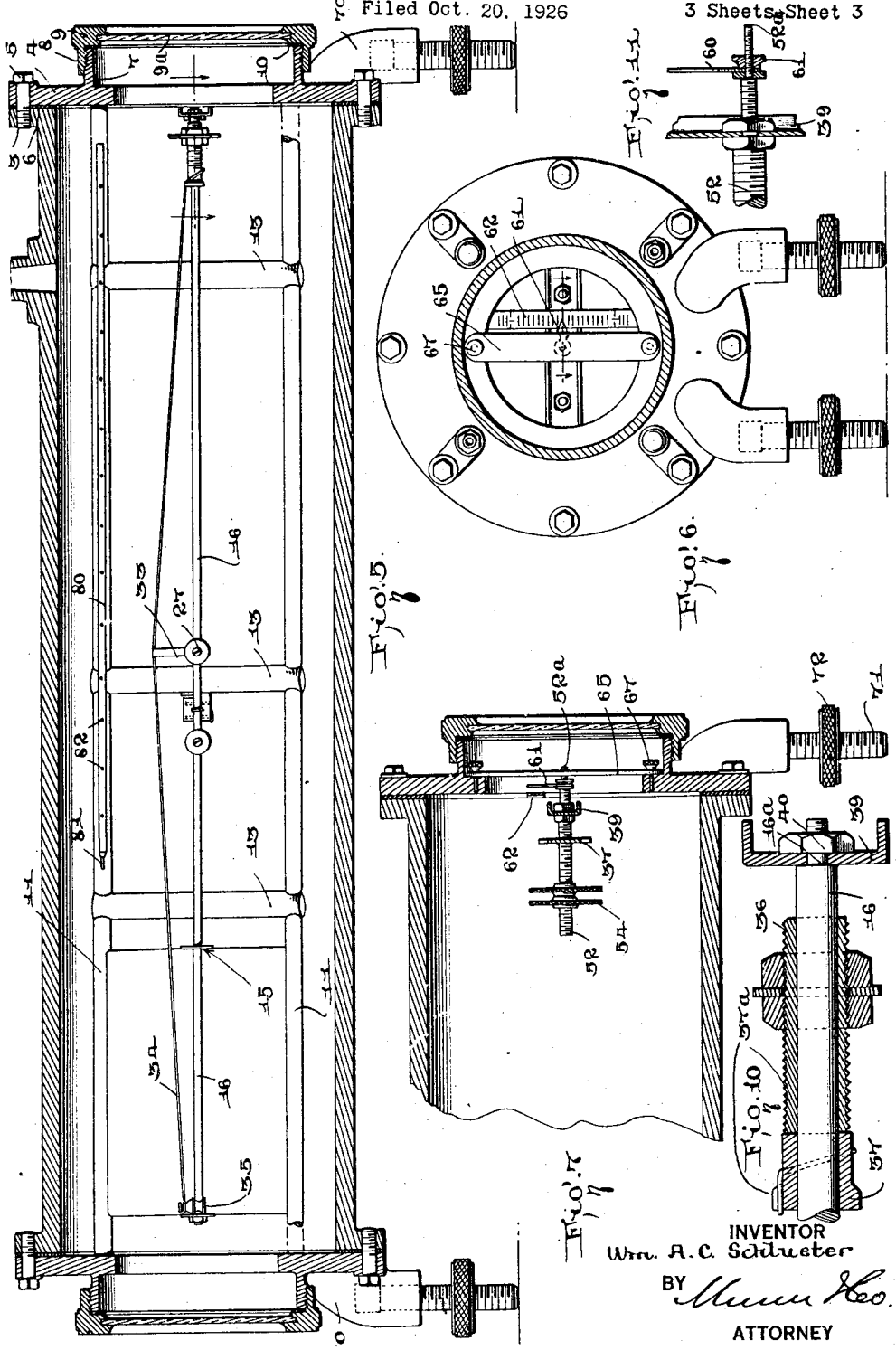
INVENTOR
Wm. A. C. Schlueter
BY
ATTORNEY Patented Nov. 15, 1927.

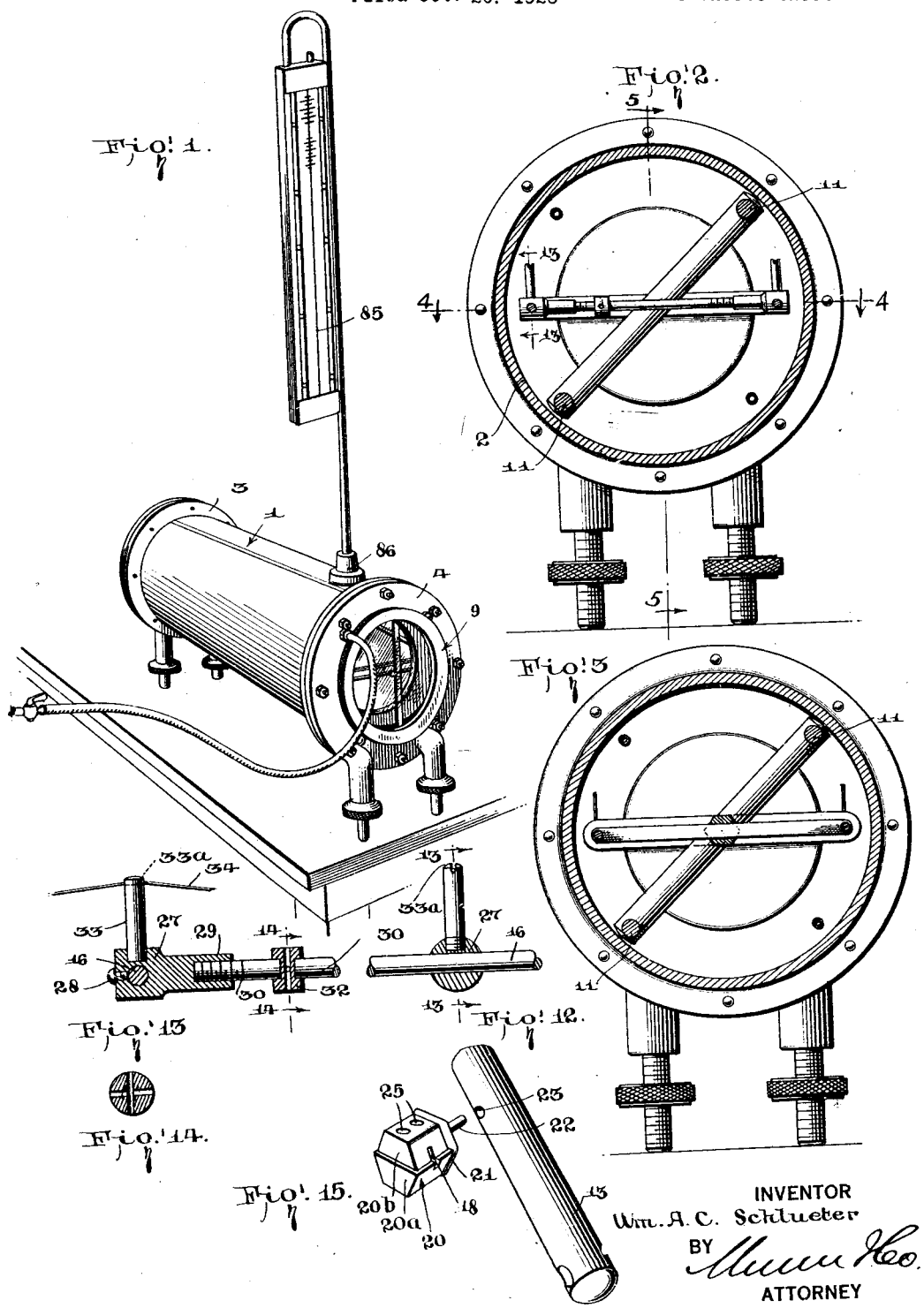

1,649,746

UNITED STATES PATENT OFFICE.

WILLIAM A. C. SCHLUETER, OF TULSA, OKLAHOMA, ASSIGNOR TO THE REFINERY SUPPLY COMPANY, OF TULSA, OKLAHOMA, A CORPORATION OF OKLAHOMA.

GRAVITY BALANCE.

Application filed October 20, 1926. Serial No. 143,004.

This invention relates to improvements in gas balances or displacers and is especially designed and adapted for use in determining the specific gravity of gases.

An object of the invention is to provide a device of this character which while being portable provides a very accurate balance.

Another object is to provide a device of this character wherein the balance mechanism may be easily and readily adjustable to obtain an accurate balance without removing the balance mechanism from the casing. Along with this advantage, the balance mechanism may be locked against movement when the device is not in use or when it is being transported, whereby the device is made portable without danger of injury thereto.

A further object of the invention is to provide a balance mechanism which is to be suspended as to eliminate friction at its point of suspension.

A still further object is to provide a device of this character wherein the balance mechanism is adjustable to regulate sensitivity, forming a feature especially desirable when the balance is used upon extremely rare or very dense gases. All of the adjustments are made from the exterior of the machine without necessitating the removal of any of the major parts.

Another object is to provide for the ready discharge of all of the gases from the casing of the balance after the test has been made for which it employs removable purging tubes adapted to be readily cleaned when cleaning is desired.

A further object is to provide a device of this character which is of simple and durable construction, reliable and accurate in operation, designed to resist acid or corrosive action of the gases or impurities therein and susceptible of manufacture from materials and by means ordinarily available.

In carrying out the present invention, a novel form of balance mechanism carrying an air tight float or displacer is suspended within a suitable casing having removable end caps, the end caps when applied provide a gas tight container and when removed facilitate the discharge of the gas and making possible adjustments of the balance mechanism. The gas is supplied to the interior of the casing through purging tubes which are removable to facilitate cleaning thereof.

The balance mechanism is suspended within the casing in such a manner as to eliminate friction at the point of suspension and this is accomplished by mounting the members of the balance frame on a tension spring, the tension being regulated by a pair of spreaders extending between the frame members of the balance on each side of the suspension spring. The frame members of the balance consists of longitudinal rods which are resilient or elastic to some extent and which have posts or struts associated therewith and organized with truss wires extending over the struts and connected to the rods adjacent the ends of the rods, at least one end of each truss wire has an adjustable connection with its rod, controllable from the exterior so that the center of gravity may be raised or lowered by varying this connection and consequently varying the tension of the truss wires and the extent to which the rods or frame members of the balance are flexed. It is at one end of this balance member that the air tight float is mounted, the float being supported at both ends on the frame members of the balance. The opposite end of the balance carries adjustable counterweights which may be adjusted from the exterior to adjust the center of gravity forward or backward of the balance and thereby obtain an accurate and true balance without the necessity of removing the balance mechanism from the case. In conjunction with the casing a manometer or mercury column is provided for the purpose of gauging the pressure in the case. It is to be understood, of course, that the balance carries a pointer or index which travels across a dial of a scale viewable from the exterior so that the specific gravity of the gas being tested may be readily observed.

Other objects and advantages reside in certain novel features of the constructions, arrangements and combination of parts which will be hereinafter more fully described and particularly pointed out in the appended claims, reference being had to the accompanying drawings forming a part of this application and in which:

Figure 1 is a perspective view showing a device embodying the present invention.

Figure 2 is a view in transverse section taken in the plane of line 2—2 of Figure 4, Figure 3 is a similar view on line 3—3 of Figure 4, Figure 4 is a view in longitudinal section on line 4—4 of Figure 2, Figure 5 is a similar view on line 5—5 of Figure 2, Figure 6 is a view of the device in end elevation, partly in section, Figure 7 is a fragmentary sectional view of one end of the casing and illustrating the counterweights of the balance and associated parts, Figure 8 is a fragmentary view in section showing how the float or displacer at one end of the balance is locked or held against movement, Figure 9 is a sectional view on line 9—9 of Figure 8, Figure 10 is a fragmentary detail view partly in section and partly in elevation illustrating the sliding sleeve construction for varying the tension of the truss wires, Figure 11 is a fragmentary detail view partly in section and partly in elevation showing how the index or pointer is connected up with the balance, Figure 12 is a fragmentary detail view partly in section and partly in elevation showing how the struts or posts are mounted on the rods or frame members of the balance, Figure 13 is a sectional view on line 13—13 of Figure 12, Figure 14 is a sectional view on line 14—14 of Figure 13, and Figure 15 is a detail perspective view showing the connecting means employed for mounting the balance frame on the casing.

Referring to the drawings, the numeral 1 designates generally a casing, said casing comprising a cylindrical body 2 having integral out-turned flanges 3 at its ends. End pieces or end plates 4 are fixed to the flanges 3 in any suitable manner, as by means of bolts or nuts 5. Packing means such as a gasket 6 is positioned between the flanges 3 and plates 4 to provide a gas tight joint. The plates 4 have outwardly extending annular flanges 7 which are externally threaded to coact with internally threaded flanges 8 provided on removable end caps 9. Rubber gaskets are provided between the caps 9 and the flanges 10 to afford a gas tight fitting between these parts. The end plates 4 carry a pair of supporting rods 11, the ends of the supporting rods extending through openings provided therefor through end plates and having cap nuts 12 threaded thereon whereby the rods are clamped in place. The rods may be suitably packed if this is found desirable or necessary. These rods 11 are braced and strengthened to provide a supporting frame by means of cross members 13 arranged at spaced intervals along the rods and extending transversely between and interconnected with the rods. Preferably, the cross members have openings adjacent their ends in which the rods 11 are tightly fitted.

On the supporting frame constituted by the side members and cross members 13, a balance designated generally at 15 is suspended. The balance 15 comprises a pair of frame members 16 preferably formed of metal rods. The rods 16 are rigidly connected with the ends of a suspension spring 17, this spring 17 being a blade spring extending transversely of the rods and having its center portion clamped in a recess 18 provided therefor in a clamping block or connecting piece 20. One of the parts 20ª of the clamping block 20 is integrally formed with a mounting plate 21 having a pin 22 which is secured in an opening 23 provided therefor in one of the cross members 13 of the supporting frame. The other part of the block 20 is designated at 20ᵇ and is clamped to the part 20ª by means of clamping screws 25.

The tension of the suspension spring 17 may be varied by means of spreaders designated generally at 26. Each spreader 26 includes a pair of heads designated at 27, the heads 27 having openings in which the side rods 16 of the balance are slidably fitted. Screws 28 hold the heads in any adjustment along the rods 16. The heads 27 have internally threaded sockets 29 which receive the oppositely threaded ends of a cross piece 30. A collar 32 is fixed at each cross piece 31 and is provided with openings adapted to coact with a pin or other suitable tool to facilitate turning the tool of the cross pieces and the spreading or drawing together of the side rods of the balance. On at least one head at each side of the balance a vertically extending strut 33 is mounted, the lower end of the strut being threaded into the head. The upper end of each strut is grooved as at 33ª to receive intermediate portions of a truss wire 34. One end of each truss wire 34 is fixed to its side rod 16 by means of a connecting piece 35 and the other end of each truss wire has an adjustable connection with its side rod 16, this adjustable connection being preferably effected in each instance by means of a sleeve 36 slidably mounted on its rod 16 and having a flange 37 at one end, around which its truss wire is looped, the flange 37 having notches 37ª receiving the strands of the loop. It will be noted by referring to Figure 4 that the sleeves 36 are transversely alined. A cross bar 37 extends between these sleeves and has its ends received on the sleeves and held thereto by nuts 38. Means is provided for shifting the cross bar 37 and consequently the sleeves 36 back and forth to vary tension of the truss wires and this means preferably comprises a channel bar 39 having openings adjacent its ends receiving the reduced extensions 16ª of the rods 16 and held on such extensions by the nuts 40. The intermediate portion of this channel bar 39 has openings therein through which threaded shanks 41 of the adjusting screws 42 extend, the screws 42 having heads 43 bearing against the channel bar. The threaded shanks 41 of the screws have threaded engagement with the nuts 44 mounted on the bar 37. With this construction, when the screws 42 are turned in one direction, they draw the bar 37 towards the channel bar 39 and increase the tension of the truss wires. Turning the screws 42 in the opposite direction permits the bar 37 to move away from the bar 39 under the influence of the tensioned truss wires and thereby decrease the tension of said wire. At one end of the side rod 16, a displacer or float in the form of a hollow air tight container 50 is provided, the float being carried by attaching pieces 51 located at both ends thereof, the attaching pieces being fastened to the float or displacer and being secured to the side rods 16. In order that this float or displacer will rise or fall in the gas in accordance with the density of the gas, it is necessary to counterweight the same and this is accomplished by mounting an externally threaded stud 52 on the channel bar 39 by means of nuts 53. On this stud 52, a plurality of disc like weights 54 are threadedly mounted. By turning the weights 54 they are shifted along the stud 52 toward and away from the point of suspension of the balance. In this way a true and accurate balance may be had, since by moving the weights 54, the center of gravity of the balance is shifted back and forth. The stud 52 is also utilized to carry the index or pointer 60, the index or pointer being clamped thereon as shown at 61 in Figure 11. This index or pointer coacts with a dial 62 mounted on one of the end pieces 4 behind the transparent pane 9ª of the adjacent end cap 9.

Means is provided for releasably locking the balance against movement when the device is not in use and is being transported. It is to be understood that in this way the device is made truly portable since handling will not tend to injure the sensitivity of the balance mechanism. This locking is provided by means of two locking bars designated at 65—66. The locking bar 65 is located at the forward end of the device and is fastened as by means of removable screws 67 to the end plate 4 at the forward end of the machine. Centrally this locking bar 65 has an opening in which the extremity 52ª of the stud 52 is fitted. The locking bar 66 is secured to the end plate 4 at the rearward end of the device by readily removable cap screws 68 and it has a number of openings 69 therein which receive the projections of pins 70 fastened to the float 50 or to the attaching piece 51 by which the float is supported on the frame of the balance.

End pieces or end plates 4 have bosses 70 cast integrally therewith or otherwise suitably connected and the bosses extending downwardly from the pieces having internally threaded screws engaging internally threaded legs 71, said legs 71 having knurled nuts intermediate their ends whereby the same may be turned. By providing vertically adjustable legs of this type, the entire device may be levelled thereby insuring accurate balance and accurate results. A level may be used in conjunction with the device if found desirable.

For the purpose of conducting the gas into the interior of the casing, a pair of purging tubes are provided. The tubes 80 having their inner ends closed as at 81 and having the portion thereof which lie in the casing perforated as at 82. The tubes having releasable threaded connection with the forward end plate 4, such connection being preferably had by threading portions of the tubes into internally threaded openings in the end plates. Locking nuts 83 are preferably provided to secure the purging tubes into the end plate 4 on which they are mounted. Beyond these locking nuts 83, the tubes 80 have corrugated nipples 84 defined to receive a hose connection or the like.

In order that the pressure of the gas within the casing may be accurately known and determined at all times, a monometer or mercury column 85 is provided and as shown in Figure 1 is adapted to communicate with the interior of the casing through a casting 86.

The device when not in use has its balance mechanism rigidly locked against movement by provision of the locking bars 65—66. When the device is to be used these locking bars are removed by first removing the end caps and then taking out the screws which secure the bars in position. The cap on the rearward end of the machine is then replaced and the index 61 is brought to register with the zero of the dial by turning the weights 54 back and forth along the stud 52. This is easily done by inserting the finger or hand through the opening afforded at the forward end of the machine when the forward cap is off. The front cap is then replaced and the mercury column is attached to the top of the case. The casing is now entirely filled with the gas to be tested by introducing the gas through one of the purging tubes 80 and leaving the other purging tube open until air has been displaced from the casing. Then the other purging tube is closed to the atmosphere and pressure is exerted on the casing until the float again reads zero on the scale. Of course it is to be understood that when the device is first filled with gas without subjecting the gas to pressure that the index will rise or fall away from the zero mark on the scale. After the index has been brought back to zero on the scale by exerting pressure on the gas as described, the pressure that exists within the casing and which is shown on the mercury column is noted. The inches in pressure are added to the barometric pressure taken from a barometer and the vacuum inches are taken from the barometric pressure and one divided into the other to obtain the specific gravity of the gas just tested. A check on the reading may be made by balancing the float while in the gas and filling the casing afterwards with air and then exerting a vacuum or suction on the air until it is as rarefied as the gas, which conditions can be determined by observing the pointer or index which registers on zero on the scale, when such a condition is obtained. The method of obtaining the specific gravity can then be reversed.

The device is adjustable for sensitivity by raising the center of gravity with truss wires. In other words by adjusting the screws 42, the tension of the truss wires is varied and the flexion of the rods of the balance frame are varied. This is not necessary in testing ordinary gases, but is a very desirable feature in testing gases that are extremely rare or very dense.

The device is lacquered inside and out to prevent corrosion from the acids or impurities in the gas. This does not apply to the suspension spring or the truss wires, which are gold plated for protection against corrosion. The truss wires may be tensioned to deflect the float or balance so as to position the center of gravity at a point under, at, or over the point of suspension. By setting these truss members, the act of the spring is compensated for thereby making possible the use of the spring pivot and eliminating friction.

I claim:

1. A specific gravity balance comprising a casing having removable end caps, a balance frame mounted within the casing, a float connected with one end of the frame and adjustable counterweights at the opposite end of the frame, said adjustable counterweights being adjustable from the exterior when the adjacent end cap is removed.

2. A specific gravity balance comprising a gas tight casing, supporting means within the casing, a balance frame including a pair of side rods, a float carried by said side rods at one end thereof, a suspension spring mounted on the supporting means and having its ends connected with the side rods, counterweights mounted on the side rods on the opposite side of the spring from the float, said side rods having posts extending from intermediate portions thereof, truss wires extending over the posts, and connections between the ends of the truss wires and the end portions of the side rods, at least one of said connections of each wire being adjustable.

3. A specific gravity balance comprising a gas tight casing, supporting means within the casing, a balance frame including a pair of side rods, a float carried by said side rods at one end thereof, a suspension spring mounted on the supporting means and having its end connected with the side rods, counterweights mounted on the side rods on the opposite side of the spring from the float, said side rods having posts extending from intermediate portions thereof, truss wires extending over the posts, and connections between the ends of the truss wires and the end portions of the side rods, at least one of said connections of each wire being adjustable and comprising a sliding sleeve mounted on each side rod and engaging with an end of its truss wires and means for moving the sleeve back and forth and holding it in adjusted position.

4. A specific gravity balance comprising a gas tight casing and balance mechanism in the casing, a pointer carried by the balance mechanism, a scale with which the pointer cooperates, and a manometer mounted on the casing, the manometer communicating with the interior of the casing whereby the pressure of the gas within said casing may be known and determined at all times.

5. A specific gravity balance comprising a casing having removable end plates, supporting rods extending between and secured to the end plates and located within the casing, cross members extending between the supporting rods, a balancing frame including a pair of side rods, a suspension spring extending between and secured to the side rods and supported on one of the cross members, a pair of spreaders cooperating with the side rods on the opposite side of the spring, posts on the side rods, truss wires extending over the posts and connected to the side rods, a float connected to one end of the side rods, counterweights at the opposite ends of the side rods, a pointer shifted with the balancing frame, and a disc with which the pointer coacts.

6. A specific gravity balance comprising a gas tight casing having removable portions, balance mechanism located within the said casing and means for locking the balance mechanism against movement, said means being accessible from the exterior when said removable portions are removed.

7. A specific gravity balance comprising a casing having removable end caps, supporting means within the casing, a balance frame suspended on the supporting means, a float at one end of the frame, counterweights at the opposite end thereof, projections at each end of the frame, locking bars having openings designed to receive the projections, and means for releasably securing the locking bar to the casing, said locking bars and said means being accessible when the end caps are removable.

8. A specific gravity balance including a casing, balancing mechanism within the casing, a pointer carried by the balancing mechanism, a scale with which the pointer cooperates, and removable purging tubes carried by the casing and projecting into the interior thereof.

9. A specific gravity balance comprising a casing, supporting means within the casing, a tension spring mounted on the supporting means, a balancing frame having side members mounted on the tension spring, adjustable spreaders extending between and connected to the side members on the opposite side of the spring, a displacer mounted on the side members on one side of the spring, counterweights mounted on the frame on the other side of the spring, an index shiftable with the balancing frame and a scale with which the index coacts.

10. In a device of the character described, a balance comprising an elongated frame having flexible side members, a pivot for the frame, and adjustable means for flexing the side frame members and thereby change the center of gravity of the frame with respect to its pivot.

11. In a device of the character described, a balance comprising an elongated frame having flexible side members, a pivot for the frame intermediate its ends, truss wires extending longitudinally of the frame, and means for adjustably tensioning the truss wires whereby the center of gravity of the frame with respect to its pivot may be varied.

12. An apparatus of the character described, comprising an elongated container, a balance arranged longitudinally within the container, and pivoted at a point intermediate its ends, a pointer at one end of balance adapted to move transversely of the associated end of container, and a scale carried by the last named end of container adapted to cooperate with the pointer to show position of the balance.

13. In an apparatus of the character described, a balance comprising an elongated frame having flexible side members, a pivot support intermediate the side members of frame, spring arms extending from the support and secured to the side members for pivoting the frame, and means whereby said side frame members may be flexed laterally for controlling the tension of said spring arms.

WILLIAM A. C. SCHLUETER.